(12) United States Patent
Stevens

(10) Patent No.: US 8,616,951 B2

(45) Date of Patent: Dec. 31, 2013

(54) GAMING SYSTEM AND A METHOD OF GAMING

(75) Inventor: Christopher Michael Stevens, Lane Cove (AU)

(73) Assignee: Aristocrat Technologies Australia Pty Limited (AU)

( * ) Notice: Subject to any disclaimer, the term of this patent is extended or adjusted under 35 U.S.C. 154(b) by 481 days.

(21) Appl. No.: 12/415,433

(22) Filed: Mar. 31, 2009

(65) Prior Publication Data

US 2009/0253496 A1 Oct. 8, 2009

(30) Foreign Application Priority Data

Mar. 31, 2008 (AU) ................................ 2008901539

(51) Int. Cl.
*A63F 13/10* (2006.01)

(52) U.S. Cl.
USPC .............................................. 463/16; 463/20

(58) Field of Classification Search
USPC ...................................................... 463/16–22
See application file for complete search history.

(56) References Cited

U.S. PATENT DOCUMENTS 5,823,874 A 10/1998 Adams
6,270,411 B1 * 8/2001 Gura et al. ...................... 463/20
7,198,570 B2 4/2007 Rodgers et al.
RE39,659 E 5/2007 Luciano, Jr. et al.
7,216,867 B1 5/2007 Luciano et al.
7,306,518 B2 * 12/2007 Hughs-Baird et al. .......... 463/16
2003/0036418 A1 * 2/2003 Seelig et al. .................... 463/16
2004/0038734 A1 2/2004 Adams
2004/0180717 A1 9/2004 Vancura
2004/0198484 A1 10/2004 Johnson
2004/0229670 A1 * 11/2004 Potter et al. ....................... 463/1
2004/0232612 A1 11/2004 Adams
2004/0235557 A1 11/2004 Adams
2005/0026673 A1 2/2005 Paulsen et al.
2005/0054425 A1 3/2005 Adams
2005/0073091 A1 4/2005 Kelly et al.
2005/0075159 A1 4/2005 Kaminkow et al.
2005/0113159 A1 5/2005 Kelly et al.
2005/0119042 A1 6/2005 Chamberlain et al.
2005/0187004 A1 8/2005 Vancura
2005/0215307 A1 9/2005 Jarvis et al.
2005/0250568 A1 11/2005 Kane et al.
2005/0250577 A1 11/2005 Adams (Continued)

FOREIGN PATENT DOCUMENTS

CA 2527294 5/2006
CA 2573519 9/2007

(Continued)

*Primary Examiner* — Fernando L Toledo
*Assistant Examiner* — Daniel Shook
(74) *Attorney, Agent, or Firm* — McAndrews, Held & Malloy, Ltd.

(57) ABSTRACT

A gaming system is disclosed which comprises a game implementer arranged to implement a game and to produce a game outcome, an outcome evaluator arranged to determine whether the game outcome corresponds to a winning outcome, and a win modification selector. The win modification selector is arranged to select a win modification identifier when a winning outcome exists from a plurality of win modification identifiers including a plurality of win multiply identifiers and at least one win reduce identifier. The gaming system also comprises a prize allocator arranged to allocate a prize to a player when a winning outcome exists and to modify the allocated prize using the selected win modification identifier. A corresponding method is also disclosed.

47 Claims, 10 Drawing Sheets

(56) References Cited

U.S. PATENT DOCUMENTS

| | | | | |
|---|---|---|---|---|
| 2006/0025200 | A1 | 2/2006 | Van Asdale | |
| 2006/0033281 | A1 | 2/2006 | Wong | |
| 2006/0073873 | A1 | 4/2006 | Rodgers et al. | |
| 2006/0151948 | A1 | 7/2006 | McGanty et al. | |
| 2006/0157927 | A1 | 7/2006 | O 'Halloran et al. | |
| 2006/0249907 | A1 | 11/2006 | Wong et al. | |
| 2007/0054723 | A1 | 3/2007 | Mattice et al. | |
| 2007/0054727 | A1 | 3/2007 | Garamendi et al. | |
| 2007/0060239 | A1 | 3/2007 | Nelson et al. | |
| 2007/0060262 | A1 | 3/2007 | Kosaka et al. | |
| 2007/0069460 | A1 * | 3/2007 | Hein et al. | 273/142 R |
| 2007/0155463 | A1 | 7/2007 | Ghaly | |
| 2007/0167211 | A1 | 7/2007 | Rodgers et al. | |
| 2007/0167238 | A1 | 7/2007 | Gatto et al. | |
| 2007/0184895 | A1 | 8/2007 | Adams | |

FOREIGN PATENT DOCUMENTS

| | | | |
|---|---|---|---|
| CN | 1695175 | A | 11/2005 |
| CN | 1732033 | A | 2/2006 |
| EP | 1498857 | | 1/2005 |
| GB | 1222878 | | 2/1971 |
| GB | 2413773 | | 11/2005 |
| JP | 20060224790 | | 8/2006 |
| JP | 2007050128 | | 3/2007 |
| JP | 2007050129 | A | 3/2007 |
| JP | 2007075593 | | 3/2007 |
| KR | 20030067101 | A | 8/2003 |
| MX | PA04001066 | A | 7/2004 |
| WO | 2005013210 | | 2/2005 |
| WO | 2005029427 | | 3/2005 |
| WO | 2006060493 | | 6/2006 |
| WO | 2006124393 | | 11/2006 |
| WO | 2007077449 | | 7/2007 |
| WO | 2007084845 | | 7/2007 |

* cited by examiner

| | | | | |
|---|---|---|---|---|
| A | A | Q | 10 | J |
| Q | J | A | J | 10 |
| Q | 9 | 9 | W | W |

GAMING SYSTEM AND A METHOD OF GAMING

RELATED APPLICATIONS

The present application is a non-provisional application, which claims priority to Australian Provisional Patent Application No. 2008901539 filed Mar. 31, 2008, which is incorporated herein by reference in its entirety.

FIELD OF THE INVENTION

The present invention relates to a gaming system and to a method of gaming.

BACKGROUND OF THE INVENTION

It is known to provide a gaming system which comprises a game controller arranged to randomly display several symbols from a predetermined set of symbols and to determine a game outcome such as a game win based on the displayed symbols. In some arrangements, a win outcome is defined on the basis of occurrence of symbols along defined win lines which may be preselected or selected by a player prior to display of symbols by the gaming system.

Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

BRIEF SUMMARY OF THE INVENTION

In accordance with a first aspect of the present invention, there is provided a gaming system comprising:

- a game implementer arranged to implement a game and to produce a game outcome;
- an outcome evaluator arranged to determine whether the game outcome corresponds to a winning outcome;
- a win modification selector arranged to select a win modification identifier when a winning outcome exists from a plurality of win modification identifiers including a plurality of win multiply identifiers and at least one win reduce identifier; and
- a prize allocator arranged to allocate a prize to a player when a winning outcome exists and to modify the allocated prize using the selected win modification identifier.

In one embodiment, the at least one win reduce identifier includes at least one BANKRUPT identifier, wherein the BANKRUPT identifier modifies the prize to zero.

The win modification identifiers may comprise at least one win identifier which has the effect of maintaining the prize the same.

In one embodiment, the gaming system is arranged to select a win modification identifier when a specific winning outcome exists which may be a winning outcome comprising at least one WILD symbol.

The gaming system may be arranged to operate in normal game mode wherein at least one base game is implemented and special game mode wherein at least one feature game is implemented.

The gaming system may be arranged to commence special game mode when a specific game outcome occurs. In addition or alternatively, the gaming system may be arranged to commence special game mode on the basis of a game event occurring during a game such as display of a particular symbol, in response to player input, based on the amount or type of bet placed, or when a special game is purchased by a player.

In one embodiment, the gaming system is arranged such that the win modification selector selects a win modification identifier only during special game mode.

Alternatively, the gaming system may be arranged such that the win modification selector selects a win modification identifier during special game mode and during normal game mode. Win modification identifiers used during normal game mode may be different to win modification identifiers used during special game mode. For example, win increase identifiers used during normal game mode may correspond to smaller increases than win increase identifiers used during special game mode.

In one embodiment, a plurality of win modification selectors are provided. The win modification selectors may have different associated volatilities.

In one embodiment, the gaming system is arranged such that selection of a win modification identifier when a winning outcome exists is optional such that a player is able to choose whether to accept a prize associated with a winning outcome or select a win modification identifier in order to provide an opportunity of winning a higher prize.

The win modification selector may be in the form of a rotatable wheel having a plurality of win modification identifiers disposed around the wheel, or in the form of a die having win modification identifiers disposed on faces of the die.

In one embodiment, the win modification selector is arranged to repeatedly select a win modification identifier, in one example at the option of a player. The number of repeat selections may be determined by occurrence of a BANKRUPT identifier such that no further selections are available if a previously selected win modification identifier corresponds to a BANKRUPT identifier. Alternatively, the number of repeat selections may be fixed, or randomly selected.

In one arrangement, the prize is a monetary prize or at least one free game.

In one embodiment, the win modification selector includes a plurality of BANKRUPT identifiers, and the gaming system is arranged to replace a BANKRUPT identifier with a different win identifier when a specific game outcome occurs, such as occurrence of a specific symbol combination during normal game mode.

In one embodiment, the win modification selector includes a plurality of blank portions, and the gaming system is arranged to add an identifier to a blank portion when a specific game outcome occurs, such as occurrence of a specific symbol combination during normal game mode.

The gaming system may be implemented as a stand alone gaming machine or across a network.

In one embodiment, one or more of the symbol selector, identifier selector, prize allocator and the outcome evaluator is constituted, at least in part, by a processor executing program code stored in a memory.

In one embodiment, the gaming system comprises a game play mechanism operable to place a wager and the outcome evaluator evaluates the outcome based on the wager.

In accordance with a second aspect of the present invention, there is provided a method of gaming comprising:

- implementing a game so as to produce a game outcome;
- determining whether the game outcome corresponds to a winning outcome;

selecting a win modification identifier when a winning outcome exists from a plurality of win modification identifiers including at least one win increase identifier and at least one win reduce identifier; and allocating a prize to a player when a winning outcome exists and to modify the allocated prize using the selected win modification identifier.

In accordance with a third aspect of the present invention, there is provided a computer program arranged when loaded into a computer to instruct the computer to operate in accordance with a gaming system comprising:

a game implementer arranged to implement a game and to produce a game outcome;

an outcome evaluator arranged to determine whether the game outcome corresponds to a winning outcome;

a win modification selector arranged to select a win modification identifier when a winning outcome exists from a plurality of win modification identifiers including at least one win increase identifier and at least one win reduce identifier; and a prize allocator arranged to allocate a prize to a player when a winning outcome exists and to modify the allocated prize using the selected win modification identifier.

In accordance with a fourth aspect of the present invention, there is provided a computer readable medium having computer readable program code embodied therein for causing a computer to operate in accordance with a gaming system comprising:

a game implementer arranged to implement a game and to produce a game outcome;

an outcome evaluator arranged to determine whether the game outcome corresponds to a winning outcome;

a win modification selector arranged to select a win modification identifier when a winning outcome exists from a plurality of win modification identifiers including at least one win increase identifier and at least one win reduce identifier; and a prize allocator arranged to allocate a prize to a player when a winning outcome exists and to modify the allocated prize using the selected win modification identifier.

In accordance with a fifth aspect of the present invention, there is provided a data signal having computer readable program code embodied therein for causing a computer to operate in accordance with a gaming system comprising:

a game implementer arranged to implement a game and to produce a game outcome;

an outcome evaluator arranged to determine whether the game outcome corresponds to a winning outcome;

a win modification selector arranged to select a win modification identifier when a winning outcome exists from a plurality of win modification identifiers including at least one win increase identifier and at least one win reduce identifier; and a prize allocator arranged to allocate a prize to a player when a winning outcome exists and to modify the allocated prize using the selected win modification identifier.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
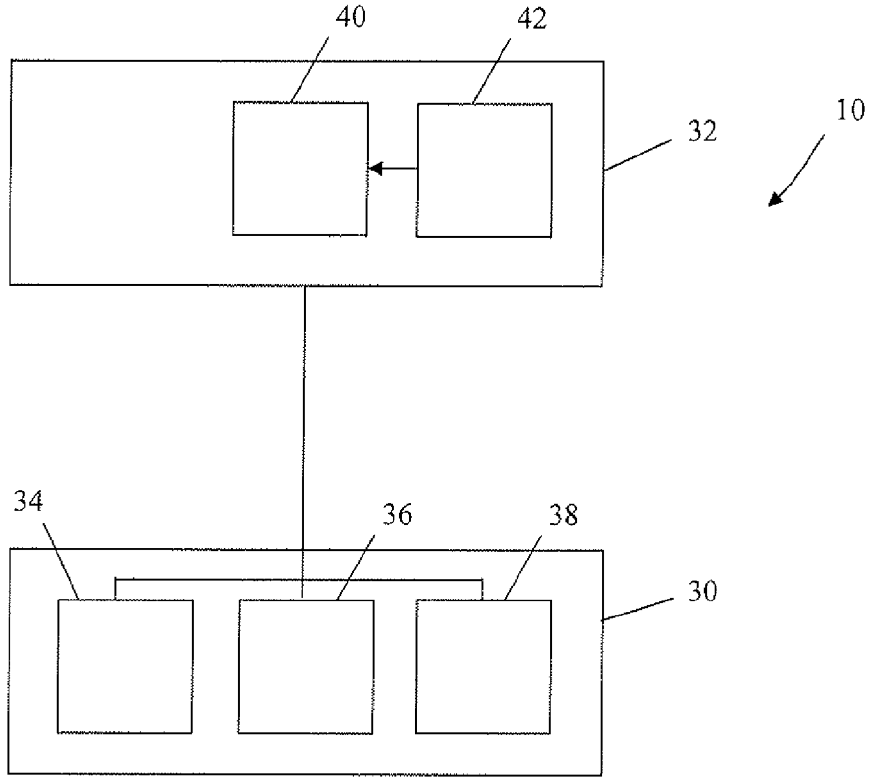
FIG. 1 is a schematic block diagram of core components of a gaming system in accordance with an embodiment of the present invention.

The present gaming system operates such that at least during a portion of a game implemented by the gaming system, when a winning outcome is obtained a player is provided with an option to randomly select a win modification identifier which is then applied to the prize associated with the winning outcome. The win modification identifier may have the effect of increasing or decreasing the prize associated with the winning outcome or maintaining the prize the same. At least one win increase modifier and at least one win reduce modifier are provided. In some embodiments, at least one win reduce identifier has the effect of reducing the prize associated with the winning outcome to zero. This is referred to in the present specification as a "bankrupt" identifier.

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. The system may have a single mode of operation or may be of the type including multiple game modes such as operable in normal game mode wherein a base game is implemented and special game mode wherein a feature game is implemented.

With some such probabilistic games, the set of symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word “WILD”, a star, or by any other suitable word or symbol. Other functions are also envisaged such as scatter functions, multiplier functions, repeat win functions, jackpot functions and feature commencement functions.

Referring to FIG. 1, a schematic diagram of core components of a gaming system 10 in accordance with the present embodiment is shown. The core components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term “processor” is used to refer generically to any device that can process game play instructions and may include a microprocessor, microcontroller, programmable logic device or other computational device such as a personal computer or a server.

Figure 2:
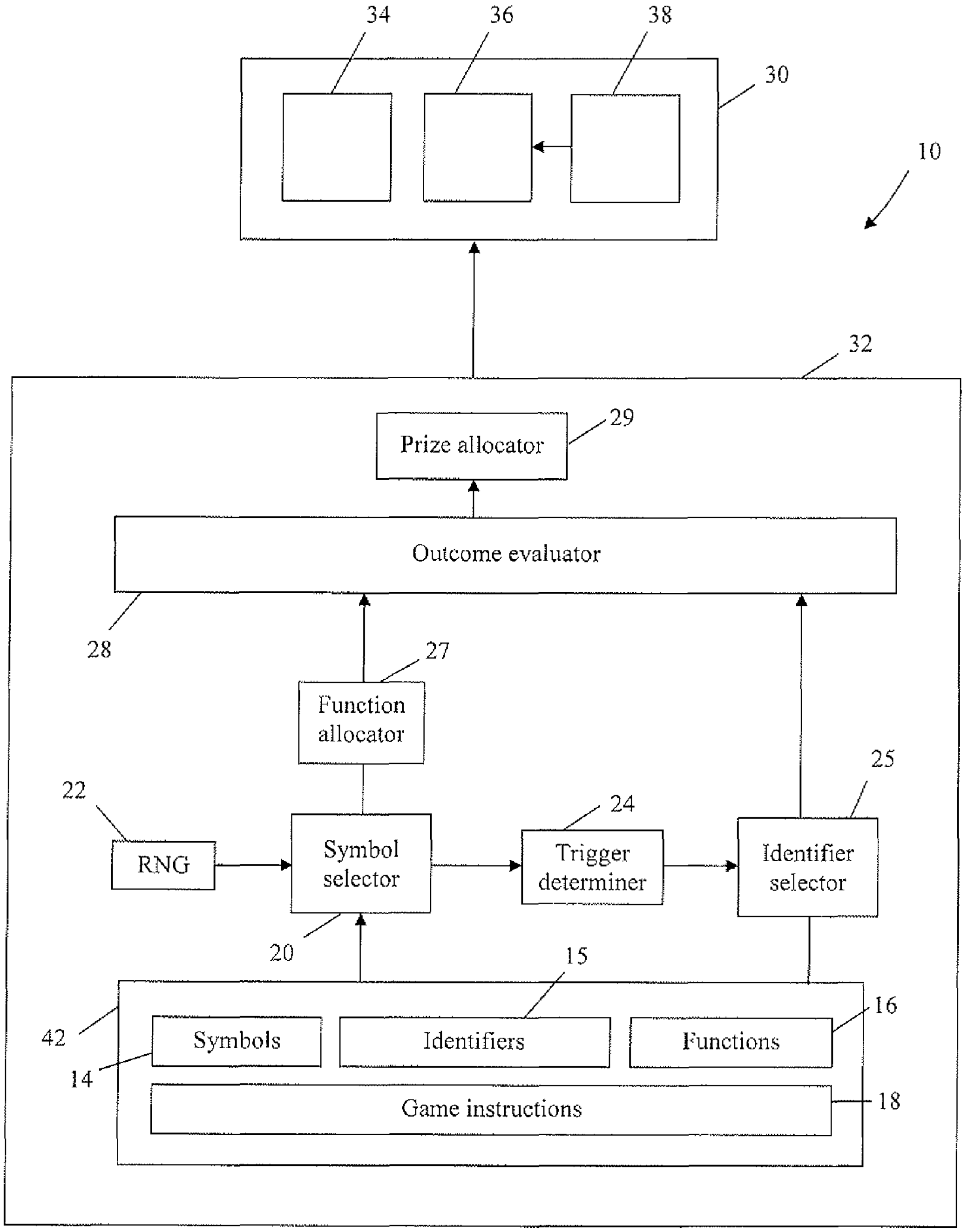
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols, in the present example associated with a plurality of reels, identifier data 15 indicative of identifiers including at least one win increase identifier and at least one win decrease identifier, function data 16 indicative of one or more functions allocatable to the symbols, and game instruction data 18 indicative of game instructions usable by the gaming machine 10 to control operation of the game.

The game controller 32 includes a symbol selector 20 which is arranged to select several symbols from the available symbols 15 for display to a player in a plurality of display positions, in this example by spinning reels containing the symbols and stopping the reels so as to display at least one symbol on each reel. In this example, the selection carried out by the symbol selector 20 is made using a random number generator 22.

It will be appreciated that the random number generator 22 may be of a type which is arranged to generate pseudo random numbers based on a seed number, and that in this specification the term “random” will be understood accordingly to mean truly random or pseudo random.

With this embodiment, the game controller 32 also comprises a trigger determiner 24 arranged to determine whether a trigger condition exists and to instruct an identifier selector 25 to select at least one identifier 15 when a trigger condition has been detected. Such a trigger condition may be display of a particular symbol or combination of symbols corresponding to a winning combination and the selected identifier 15 in this example is applied to the prize associated with the winning combination so as to increase or decrease the prize, or maintain the prize the same.

The gaming system may also be arranged so as to operate in normal game mode wherein at least one base game is implemented and special game mode wherein at least one feature game is implemented. The trigger determiner 24 may be arranged so as to commence special game mode based on display of a particular symbol or combination of symbols during normal game mode. The identifier selector 25 may select at least one identifier 15 during normal game mode and/or during special game mode.

In this example, the game controller 32 also comprises a function allocator 27 arranged to select and allocate one or more functions to one or more symbols. Such functions include a wild function, a scatter function, or any other function which may be applied to a symbol or to the game.

The game controller 32 also comprises an outcome evaluator 28 which in accordance with the game instructions 18 determines game outcomes based on the symbols selected for display to the player by the symbol selector 20, and a prize allocator 29 arranged to allocate a prize to a player when a winning outcome exists, the type of prize being dependent on the winning outcome and being modified when a win modification identifier 15 is selected by the identifier selector 25.

In the embodiments described below, the symbol selector 20, the trigger determiner 24, the identifier selector 25, the function allocator 27, and the outcome evaluator 28, and the prize allocator 29 are at least partly implemented using the processor 40 and associated software, although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a “thick client” architecture may be used wherein part of the game is executed on a player operable gaming terminal and part of the game is executed remotely, such as by a gaming server; or a “thin client” architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Figure 3:
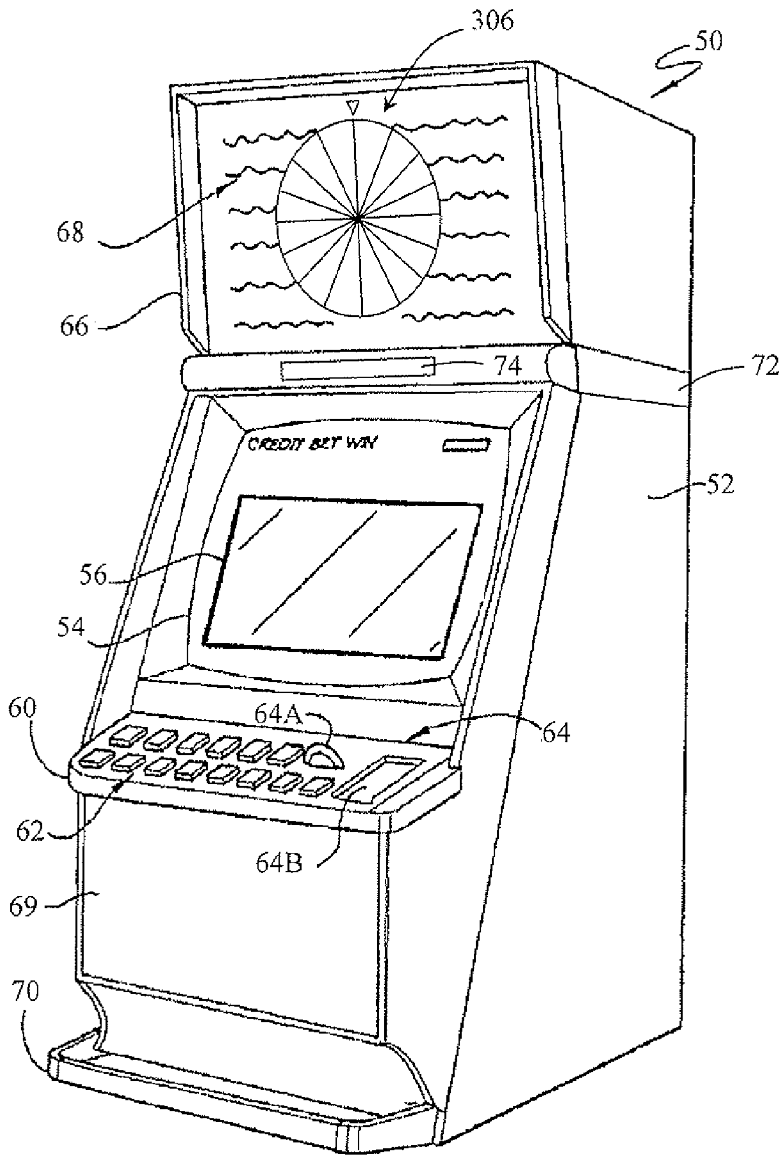
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
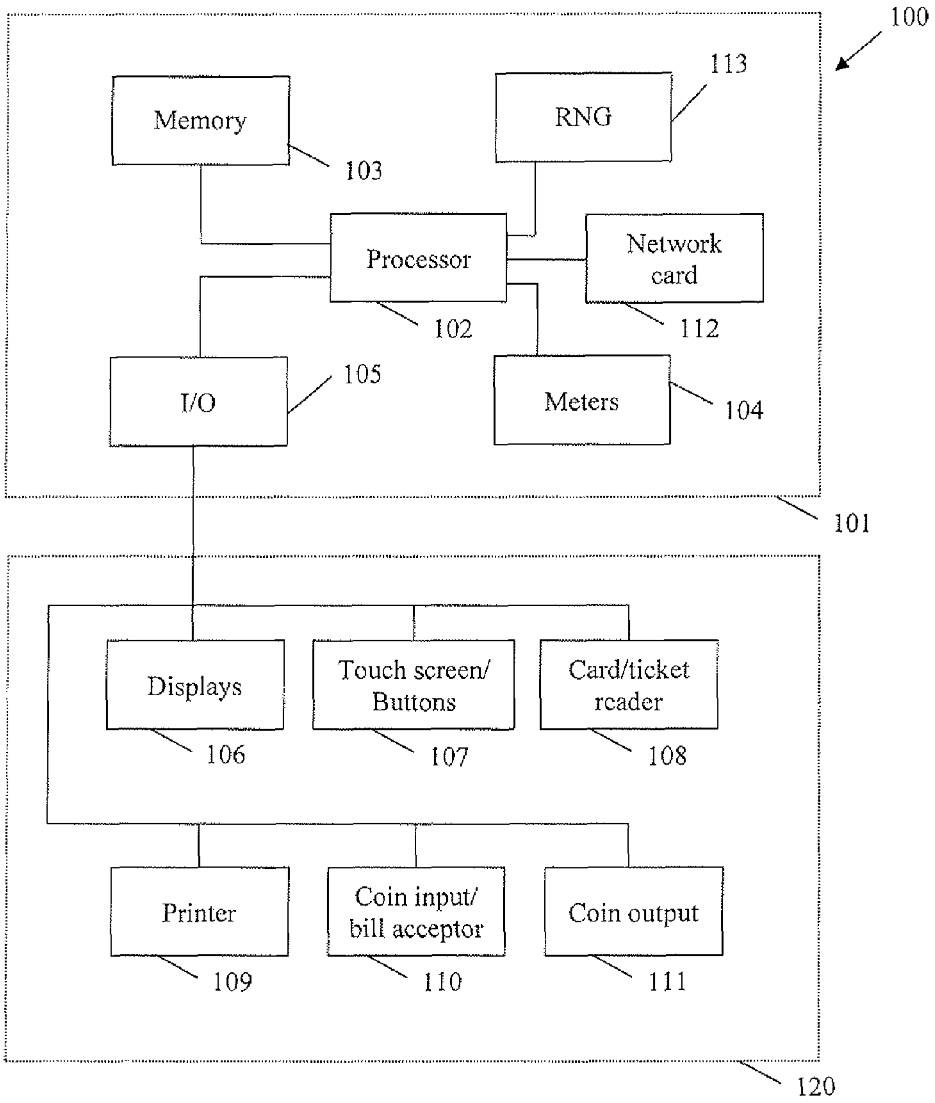
FIG. 4 is a schematic block diagram of operative components of the gaming machine shown in FIG. 3.

FIG. 4 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
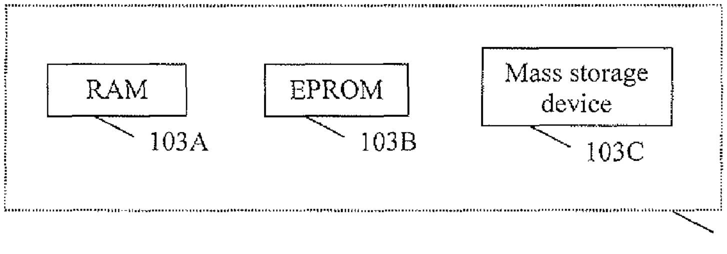
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

Figure 6:
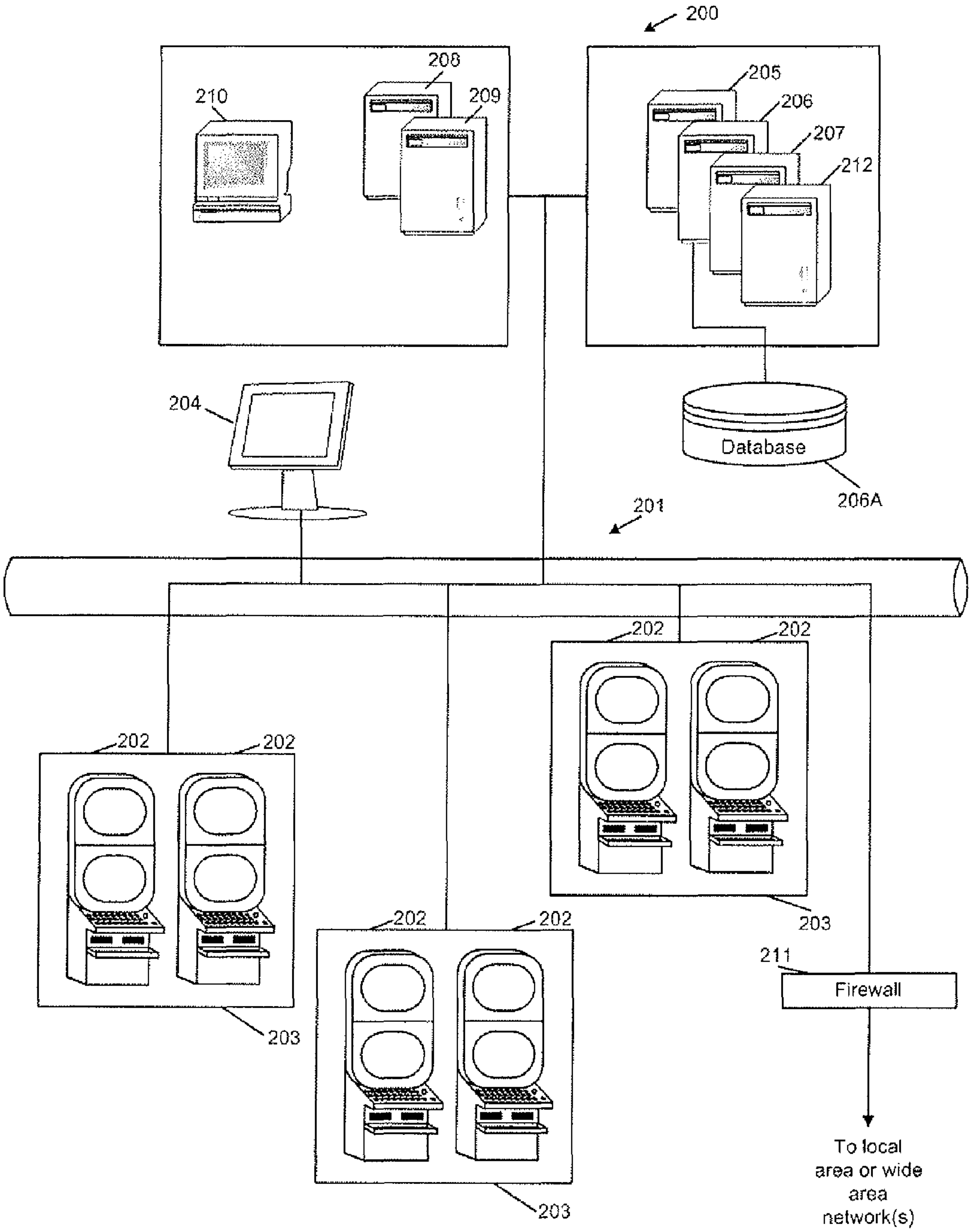
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of the gaming system will now be described in relation to a stand alone gaming machine 10 although it will be understood that implementation may also be carried out using other gaming system architectures such as a network architecture of the type shown in FIG. 6.

In this example, the gaming system is operable in normal game mode and special game mode and the gaming system comprises five reels, each of which has an associated set of symbols.

The reels comprise standard symbols and optionally one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as disposed on a win line, the player wins a prize.

The gaming system may be arranged to commence special game mode when a predetermined game outcome occurs, and special game mode may comprise one or more free games. Special game mode may commence automatically on the basis of a game event occurring during a game such as display of a particular symbol, based on game outcomes determined by the gaming system, or may be prompted by a player pressing a button on the gaming system 10 after the player has identified that a game outcome corresponding to special game mode requirements has occurred.

The gaming system 10 may also be arranged so as to determine eligibility for special game mode, for example based on the amount or type of bet placed, based on certain time periods and so on.

Special game mode may also be arranged to commence when a special game is purchased by a player.

Figure 7:
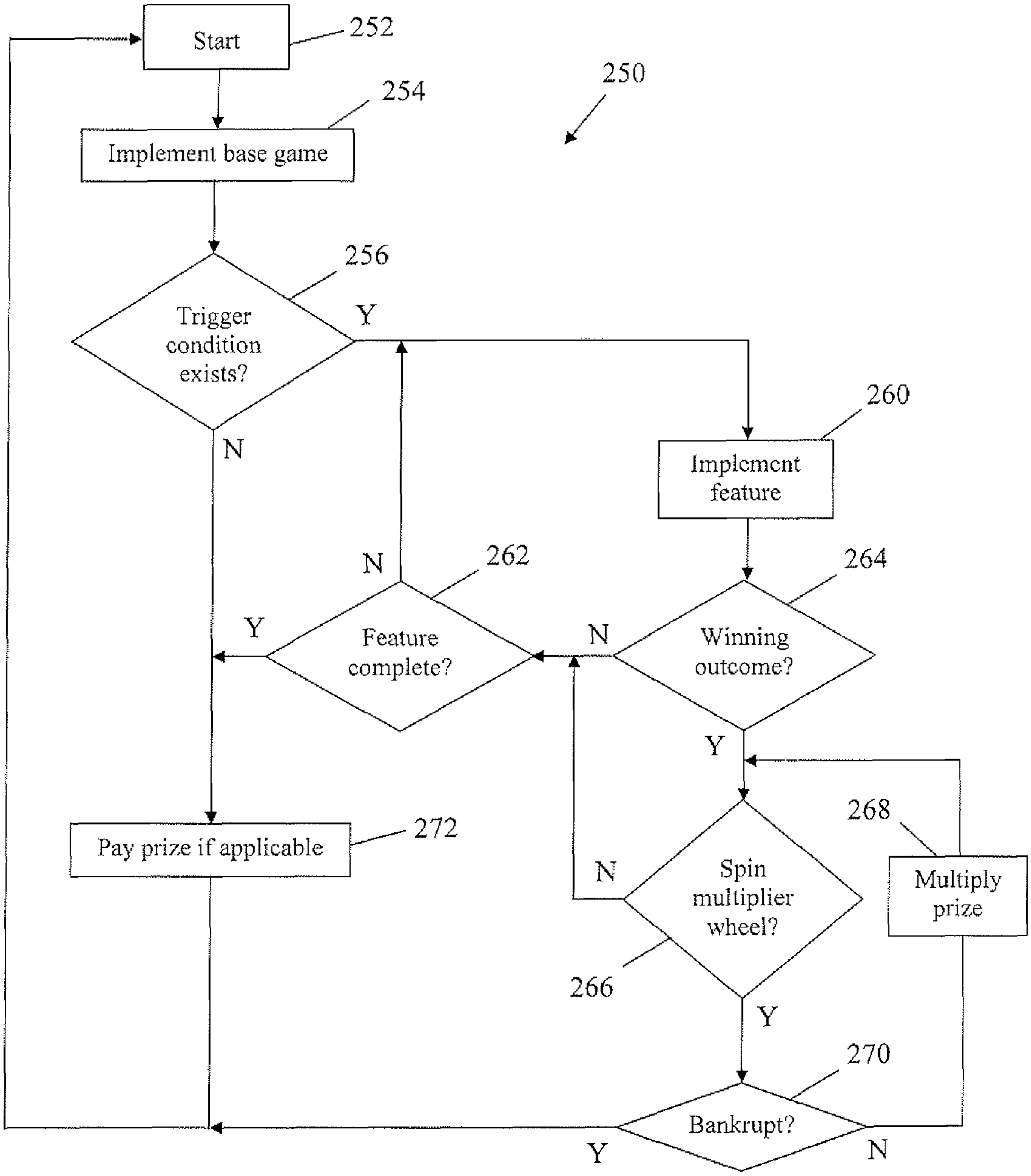
FIG. 7 is a flow diagram illustrating game play of a gaming system in accordance with an embodiment of the present invention.

A specific example will now be described in relation to flow diagram 250 shown in FIG. 7 which illustrates steps 252 to 272 of a method of gaming implemented by the gaming system according to the present embodiment.

In this example, five virtual reels are provided and, as such, representations of the reels are displayed on a graphical display device 54.

During implementation of a game, when a winning outcome occurs a player is provided with an opportunity to cause the identifier selector 25 to select a win modification identifier 15 which is then used to potentially modify the prize associated with the winning outcome. For example, the win modification identifier may cause the prize to be increased, such as multiplied by a factor determined by the win modification identifier 15, may cause the prize to be decreased, such as divided by a factor determined by the win modification identifier 15, may cause the prize to be reduced to zero, or may cause the prize to remain the same.

The win modification identifiers available for selection may be displayed to a player on portions of a win modification selector, for example on segments of a rotatable wheel, on sides of a die, and so on, with the gaming system 10 being arranged to randomly select one of the portions and to indicate to a player that one of the portions has been selected.

The gaming system in this example is arranged to operate in normal game mode and special game mode, and special game mode commences when a trigger condition exists.

It will be understood that the prize awarded to a player may be a monetary prize, may be in the form of a number of free games which may be feature games, or may be in any other suitable form.

Figure 8:
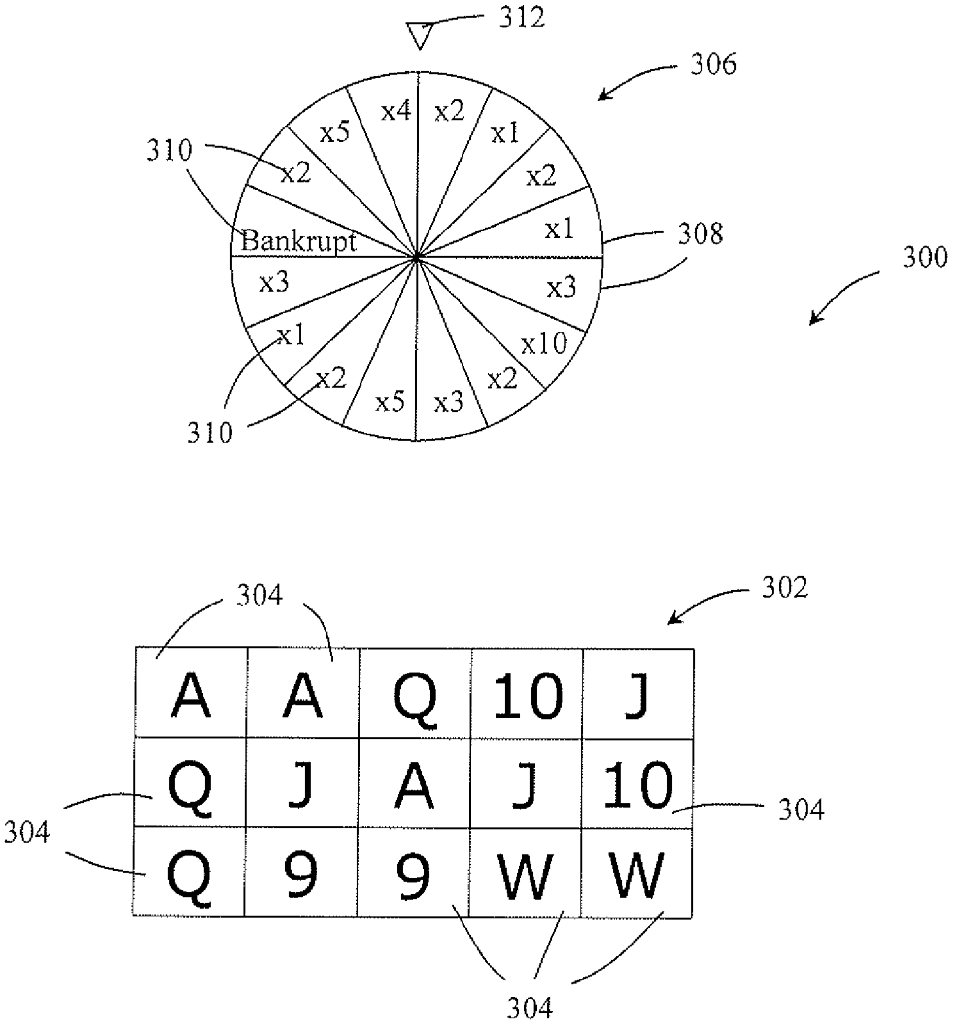
FIG. 8 is a diagrammatic representation of an example display area and an example win modification selector shown on a gaming system in accordance with an embodiment of the present invention during implementation of a game.

In FIG. 8, a gaming system 300 including an example display 302 having a plurality of selected symbols 304 and a win modification selector 306 in the form of a rotatable wheel is shown diagrammatically. The selector 306 includes a plurality of segments 308, each of which has a modification identifier 310 associated therewith. The modification identifiers 310 comprise win increase identifiers which have the effect when selected of increasing a prize associated with a winning outcome, win decrease identifiers which have the effect when selected of reducing a prize associated with a winning outcome, win identifiers which have the effect when selected of maintaining a prize associated with a winning outcome the same, and a BANKRUPT identifier which has the effect when selected of reducing a prize associated with a winning outcome to zero. The win increase identifiers may be in the form of multipliers, such as ×2, ×3, ×4, ×5 or ×10. The win reduce identifiers may be in the form of dividers, such as ½, ¼ which reduce the prize to a non-zero amount. The win modification selector also includes a pointer 312 which is used to indicate to a player which segment 308 and thereby which win identifier is selected.

In the present example, a player is provided with the option of spinning the win modification selector 306 when a winning outcome occurs during special game mode, although it will be understood that other arrangements are possible. For example, a player may be provided with the option of spinning the win modification selector 306 when a winning outcome occurs during special game mode or during normal game mode. The win modification identifiers may be the same or different during normal game mode and special game mode. In one embodiment, the win modification identifiers comprise smaller multipliers during normal game mode than special game mode.

In this example, spinning the win modification selector 306 is optional, although in some embodiments spinning the win modification selector may not be optional.

In the present example in FIG. 8, which shows an outcome during special game mode corresponding to 5 ACE symbols (3 ACE symbols in rows 1 to 3 and 2 WILD symbols in rows 4 and 5). Since this is a winning outcome, the player is provided with the option of spinning the win modification selector 306, which may occur for example by the player pressing an appropriate button on a gaming machine. If the player chooses to spin the selector 306, the player has the opportunity of increasing the prize associated with the winning outcome. Activation of the win modification selector 306 causes the identifier selector 25 to randomly select a segment 308 and thereby a win modification identifier 310, for example using the random number generator 22. If the player chooses to not spin the selector 306, the player receives the prize associated with the winning outcome.

After selection of a win modification identifier 310, the identifier 310 is applied to the prize associated with the winning outcome. For example, if a "×2" identifier 310 is selected, the prize is multiplied by 2; if a "×1" identifier is selected, the prize remains the same; and if a BANKRUPT identifier is selected, the prize is reduced to zero.

In the present example, a player is provided with the option of spinning the win modification selector 306 whenever a winning outcome is achieved during special game mode. However, other arrangements are possible. For example, a player may be provided with the option of spinning the win modification selector 306 only when specific types of winning outcome occur, such as a winning outcome which includes at least one WILD symbol.

Figure 9:
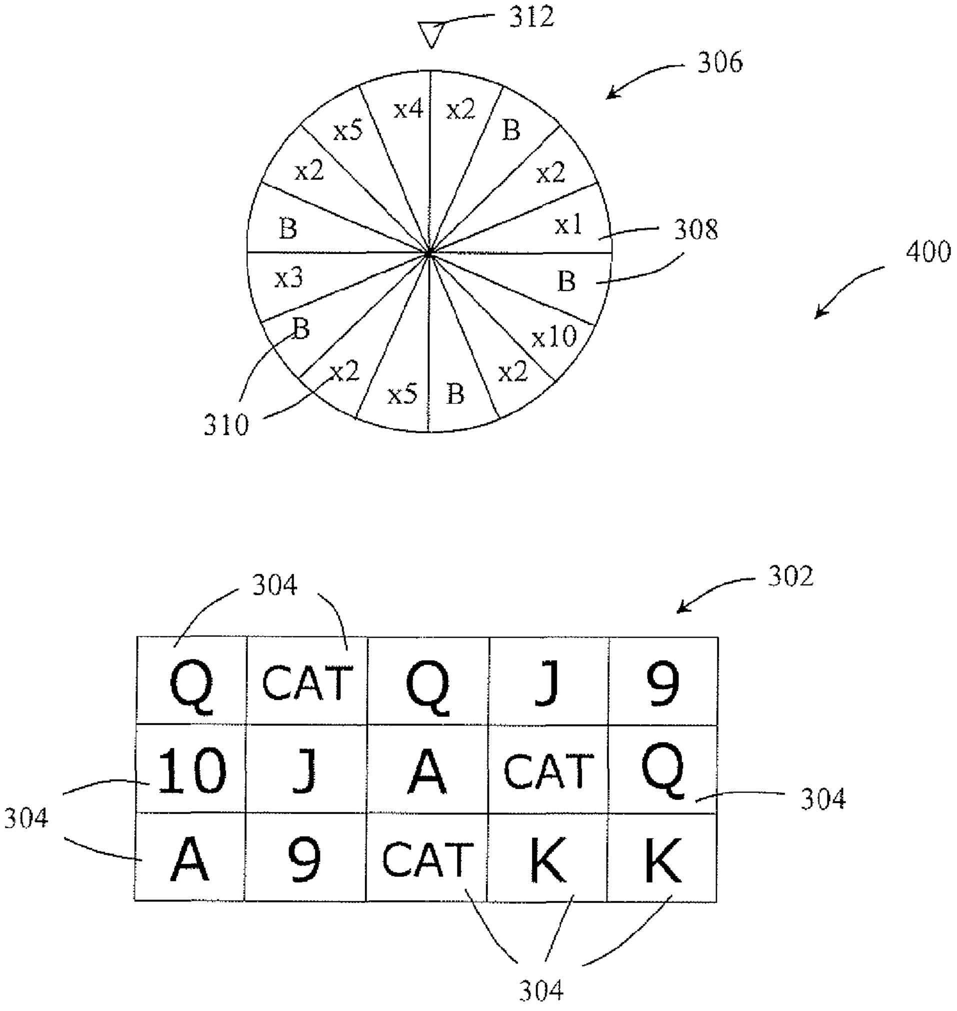
FIG. 9 is a diagrammatic representation of a further example of a display area and win modification selector shown on a gaming system in accordance with an embodiment of the present invention during implementation of a game.

An alternative embodiment of a gaming system 400 is shown in FIG. 9. Like and similar features are indicated with like reference numerals.

Operation of this embodiment is similar to the embodiment shown in FIG. 8. However, with this embodiment during normal game mode multiple BANKRUPT identifiers 310 exist on the win modification selector 306, and the gaming system is arranged to progressively replace the BANKRUPT identifiers 310 when specific game outcomes occur. For example, when an outcome including 3 or more scattered CAT symbols occurs, one of the BANKRUPT identifiers 310 may be replaced with a multiplier identifier, for example selected at random. In addition or alternatively, BANKRUPT identifiers may be replaced when selected during special game mode.

Figure 10:
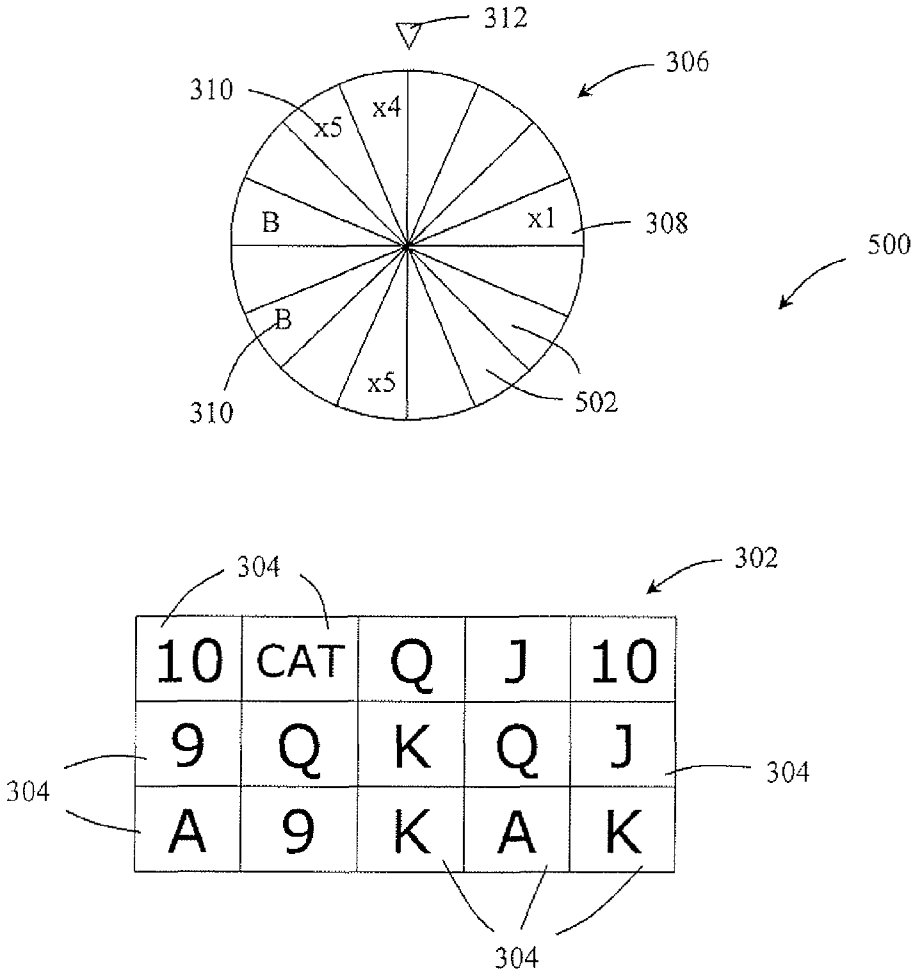
FIG. 10 is a diagrammatic representation of a further example of a display area and win modification selector shown on a gaming system in accordance with an embodiment of the present invention during implementation of a game.

A further alternative embodiment of a gaming system 500 is shown in FIG. 10. Like and similar features are indicated with like reference numerals.

Operation of this embodiment is similar to the embodiment shown in FIG. 9. However, with this embodiment during normal game mode several blank segments 502 exist and the gaming system is arranged to progressively add identifiers 310 to the blank segments 502 when specific game outcomes occur. For example, when an outcome including 1 or more CAT symbols occurs, an identifier which may be selected at random is added to one of the blank segments 502.

A further alternative embodiment of a gaming system may include at least 2 win modification selectors 306, each of which includes a different set of win modification identifiers 310 corresponding to different win volatilities. The gaming system may be arranged such that a player has the option of selecting any one of the win modification selectors 306.

With this embodiment, during normal game mode several blank segments 502 exist and the gaming system is arranged to progressively add identifiers 310 to the blank segments 502 when specific game outcomes occur. For example, when an outcome including 1 or more CAT symbols occurs, an identifier which may be selected at random is added to one of the blank segments 502.

A further alternative embodiment of a gaming system may include at least 1 win modification selector 306 having no BANKRUPT identifiers. For example, 2 win modification selectors 306 may be provided, one of the selectors 306 including at least one BANKRUPT identifier and one of the selectors 306 including no BANKRUPT identifiers. With this example, a player may choose to spin the selector 306 with no BANKRUPT identifiers only once.

Figure 11:
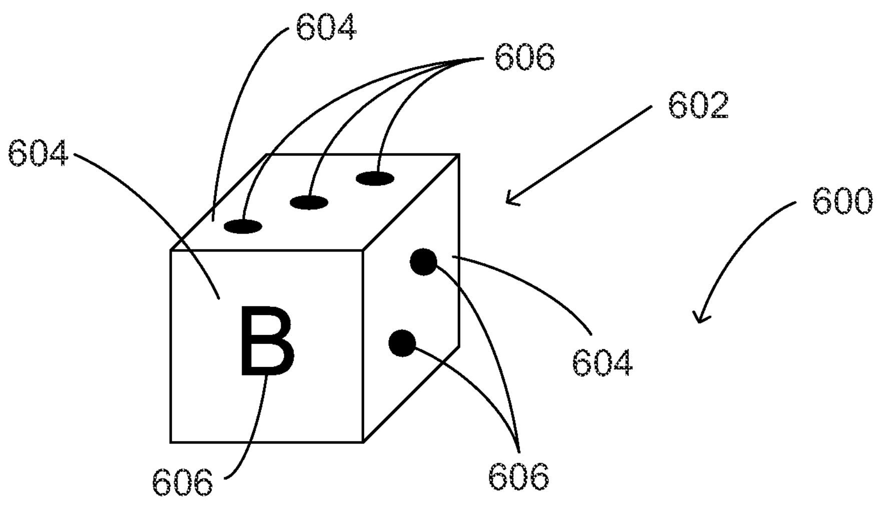
FIG. 11 is a diagrammatic representation of a further example of a display area and win modification selector shown on a gaming system in accordance with an embodiment of the present invention during implementation of a game.

A further alternative embodiment of a gaming system 600 is shown in FIG. 11. Like and similar features are indicated with like reference numerals.

Operation of this embodiment is similar to the embodiment shown in FIGS. 8 to 10. However, with this embodiment the win modification selector 602 is in the form of a die having a plurality of faces 604, each face having an associated win modification identifier 606 which serves to modify the prize associated with a winning outcome. For example, the identifiers may comprise die numbers which correspond to prize multipliers and at least one B letter which corresponds to BANKRUPT.

The player may be provided with the option of selecting an identifier once or of repeatedly selecting an identifier until either a BANKRUPT identifier is obtained or the player decides to not select an identifier. In one variation, a specific number of selections may be available to a player, which may be randomly selected. For example, a representation of a rolling die may appear on the display of the gaming machine, with the outcome used to determine the number of available selections.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

Modifications and variations as would be apparent to a skilled addressee are deemed to be within the scope of the present invention.

The invention claimed is:

1. A gaming system comprising:

a display;

a game implementer arranged to implement a game and to produce a game outcome to be displayed on the display;

an outcome evaluator arranged to determine whether the game outcome corresponds to a winning outcome, said winning outcome having a corresponding winning outcome prize;

a win modification selector having a plurality of selectable win modification identifiers displayed on the display, said win modification selector arranged to select a win modification identifier, when a winning outcome exists, from the displayed win modification identifiers, some but not all of said plurality of selectable win modification identifiers being replaceable, the win modification identifiers including (1) a plurality of win multiply identifiers, (2) at least one win reduce identifier and (3) at least one designated identifier, wherein only said at least one designated identifier is replaceable; and a prize allocator arranged to modify the winning outcome prize using the selected win modification identifier.

2. A gaming system as claimed in claim 1, and wherein the at least one win reduce identifier includes at least one BANKRUPT identifier, and wherein said prize allocator arranged to modify the winning outcome prize to zero using the BANKRUPT identifier.

3. A gaming system as claimed in claim 1, and wherein the win modification identifiers comprise at least one win identifier which has an effect of maintaining the winning outcome prize the same.

4. A gaming system as claimed in claim 1, and wherein the win modification selector is arranged to select a win modification identifier when a specific winning outcome exists.

5. A gaming system as claimed in claim 1, and wherein the game implementer is arranged to operate in 1) a normal game mode wherein at least one base game is implemented and 2) a special game mode wherein at least one feature game is implemented.

6. A gaming system as claimed in claim 5, and wherein the game implementer is arranged to commence the special game mode when a specific game outcome occurs.

7. A gaming system as claimed in claim 5, and wherein the win modification selector is arranged to select a win modification identifier only during the special game mode.

8. A gaming system as claimed in claim 5, and wherein the win modification selector is arranged to select a win modification identifier during the special game mode and during the normal game mode.

9. A gaming system as claimed in claim 8, and wherein the win modification selector is arranged to use win modification identifiers during the normal game mode that are different than to win modification identifiers used during the special game mode.

10. A gaming system as claimed in claim 9, and wherein the win modification selector is arranged to use win multiply identifiers during the normal game mode that correspond to smaller prize increases than win multiply identifiers used during the special game mode.

11. A gaming system as claimed in claim 1, and further including another win modification selector.

12. A gaming system as claimed in claim 11, and wherein the win modification selector and the another win modification selector have different associated volatilities.

13. A gaming system as claimed in claim 1, and wherein the gaming system is arranged such that the selection of a win modification identifier when a winning outcome exists is optional such that a player is able to choose whether to accept the winning outcome prize associated with a winning outcome or to select a win modification identifier in order to provide an opportunity of winning a higher prize.

14. A gaming system as claimed in claim 1, and wherein the win modification selector includes a rotatable wheel having a plurality of win modification identifiers disposed around the wheel.

15. A gaming system as claimed in claim 1, and wherein the win modification selector includes a die having win modification identifiers disposed on the faces of the die.

16. A gaming system as claimed in claim 1, and wherein the win modification selector is arranged to repeatedly select a win modification identifier from the plurality of selectable win modification identifiers.

17. A gaming system as claimed in claim 16, and wherein the number of repeat selections is determined by occurrence of a BANKRUPT identifier such that no further selections are made if a previously selected win modification identifier corresponds to a BANKRUPT identifier.

18. A gaming system as claimed in claim 16, and wherein the number of repeat selections is fixed.

19. A gaming system as claimed in claim 16, and wherein the number of repeat selections is randomly selected.

20. A gaming system as claimed in claim 1, and wherein the winning outcome prize is a monetary prize or at least one free game.

21. A gaming system as claimed in claim 1, and wherein the win modification selector includes a plurality of BANKRUPT identifiers, and the gaming system is arranged to replace a BANKRUPT identifier with a different win identifier when a specific game outcome occurs.

22. A gaming system as claimed in claim 21, and wherein the gaming system is arranged to replace a BANKRUPT identifier with a different win identifier when a specific symbol combination occurs during a normal game mode.

23. A gaming system as claimed in claim 1, and wherein the win modification selector includes a plurality of blank portions, and the gaming system is arranged to add an identifier to a blank portion when a specific game outcome occurs.

24. A gaming system as claimed in claim 23, and wherein the gaming system is arranged to add an identifier to a blank portion when a specific symbol combination occurs during a normal game mode.

25. A gaming system as claimed in claim 1, and wherein the gaming system comprises a game play mechanism operable to place a wager and the outcome evaluator evaluates the outcome based on the wager.

26. A method of gaming for use with a gaming system having a controller and a display, the method comprising:

implementing via the controller a game so as to produce a game outcome on the display;

determining via the controller whether the game outcome corresponds to a winning outcome, said winning outcome having a corresponding winning outcome prize;

displaying a win modification identifier selector having a plurality of selectable win modification identifiers, some but not all of said plurality of selectable win modification identifiers being replaceable, the win modification identifiers including (1) a plurality of win multiply identifiers, (2) at least one win reduce identifier and (3) at least one designated identifier wherein only said designated identifier is replaceable;

selecting via the controller a win modification identifier, when a winning outcome exists, from the plurality of win modification identifiers; and modifying via the controller the winning outcome prize using the selected win modification identifier.

27. A method as claimed in claim 26, and wherein the at least one win reduce identifier includes at least one BANKRUPT identifier, and the method further comprising modifying the winning outcome prize to zero using the BANKRUPT identifier.

28. A method as claimed in claim 26, and wherein the win modification identifiers comprise at least one win identifier which has an effect of maintaining the winning outcome prize the same.

29. A method as claimed in claim 26, and the method further comprising selecting a win modification identifier when a specific winning outcome exists.

30. A method as claimed in claim 26, and the method further comprising operating in 1) a normal game mode wherein at least one base game is implemented and 2) a special game mode wherein at least one feature game is implemented.

31. A method as claimed in claim 30, and wherein win multiply identifiers used during the natural game mode correspond to smaller prize increases than win multiply identifiers used during the special game mode.

32. A method as claimed in claim 30, and the method further comprising commencing the special game mode when a specific game outcome occurs.

33. A method as claimed in claim 30, and the method further comprising selecting a win modification identifier only during the special game mode.

34. A method as claimed in claim 30, and the method further comprising selecting a win modification identifier during the special game mode and during the normal game mode.

35. A method as claimed in claim 34, and further comprising using win modification identifiers during the normal game mode which are different to win modification identifiers used during the special game mode.

36. A method as claimed in claim 26, and further comprising providing a plurality of win modification selectors.

37. A method as claimed in claim 36, and wherein the win modification selectors have different associated volatilities.

38. A method as claimed in claim 26, and the method further comprising providing an option to effect the selection of a win modification identifier when a winning outcome exists to accept the winning outcome prize associated with a winning outcome or to select a win modification identifier in order to provide an opportunity of winning a higher prize.

39. A method as claimed in claim 26, and further comprising repeatedly selecting a win modification identifier from the plurality of win modification identifiers.

40. A method as claimed in claim 39, and wherein the number of repeat selections is determined by occurrence of a BANKRUPT identifier such that no further selections are available if a previously selected win modification identifier corresponds to a BANKRUPT identifier.

41. A method as claimed in claim 40, and wherein the number of repeat selections is fixed.

42. A method as claimed in claim 40, and wherein the number of repeat selections is randomly selected.

43. A method as claimed in claim 26, and wherein the winning outcome prize is a monetary prize or at least one free game.

44. A method as claimed in claim 26, and wherein a plurality of BANKRUPT identifiers are provided, and the method further comprising replacing a BANKRUPT identifier with a different win identifier when a specific game outcome occurs.

45. A method as claimed in claim 44, and the method further comprising replacing a BANKRUPT identifier with a different win identifier when a specific symbol combination occurs during normal game mode.

46. A method as claimed in claim 26, and a plurality of blank portions are provided, and the method further comprising adding an identifier to a blank portion when a specific game outcome occurs.

47. A method as claimed in claim 46, and the method further comprising adding an identifier to a blank portion when a specific symbol combination occurs during normal game mode.

* * * * *

UNITED STATES PATENT AND TRADEMARK OFFICE

CERTIFICATE OF CORRECTION

PATENT NO. : 8,616,951 B2
APPLICATION NO. : 12/415433
DATED : December 31, 2013
INVENTOR(S) : Stevens It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this
Fifth Day of May, 2015

Michelle K. Lee
*Director of the United States Patent and Trademark Office*